United States Patent [19]

Hegenberg, deceased et al.

[11] 4,170,588
[45] Oct. 9, 1979

[54] SYNTHETIC RESIN STABILIZERS BASED ON QUADRATIC ACID AMIDES

[75] Inventors: Peter Hegenberg, deceased, late of Marl, Fed. Rep. of Germany, by Anna F. Hegenberg; Johanna M. Hegenberg, heir; Dagmar Hegenberg, heir, both of Munich, Fed. Rep. of Germany; Joachim Hegenberg, heir, Neukäferloh bei Munich, Fed. Rep. of Germany; Felicitas Zottl, heir, Munich, Fed. Rep. of Germany; Sigrid Rossnagel, heir, Wendelstein bei Nürnberg, Fed. Rep. of Germany; Heidelore Freyberger, heir, Munich, Fed. Rep. of Germany; Hans-Ernst Sprenger, Wanne-Eickel, Fed. Rep. of Germany; Helmut Birkner, Marl, Fed. Rep. of Germany; Armin Gude, Marl, Fed. Rep. of Germany; Gerhard Menzel, Marl, Fed. Rep. of Germany; Konrad Rombusch, Marl, Fed. Rep. of Germany

[73] Assignee: Chemische Werke Hüls Aktiengesellschaft, Marl, Fed. Rep. of Germany

[21] Appl. No.: 828,597

[22] Filed: Aug. 29, 1977

[30] Foreign Application Priority Data

Aug. 28, 1976 [DE] Fed. Rep. of Germany ....... 2638855
May 21, 1977 [DE] Fed. Rep. of Germany ....... 2723020

[51] Int. Cl.$^2$ .................. C08K 5/34; C08K 5/35; C08K 5/29
[52] U.S. Cl. .................. 260/45.8 N; 260/45.8 NT; 260/45.8 NZ; 260/45.9 R; 260/45.9 QA
[58] Field of Search .................. 260/45.9 R, 45.9 QA, 260/45.8 N, 45.8 NT, 45.8 NZ, 45.7 R

[56] References Cited

U.S. PATENT DOCUMENTS 2,952,660   9/1960   Havens ..................... 260/45.7 R

FOREIGN PATENT DOCUMENTS 1186096   4/1970   United Kingdom .

OTHER PUBLICATIONS

Tetrahedron Letters, No. 11, pp. 1339-1343, 1968, Manecke et al.

Primary Examiner—V. P. Hoke
Attorney, Agent, or Firm—Gilbert L. Wells

[57] ABSTRACT

Shaped or unshaped synthetic resins having about 0.01-5% by weight of stabilizers where the stabilizers are bisamides of quadratic acids having the general formulas I and/or II as follows:

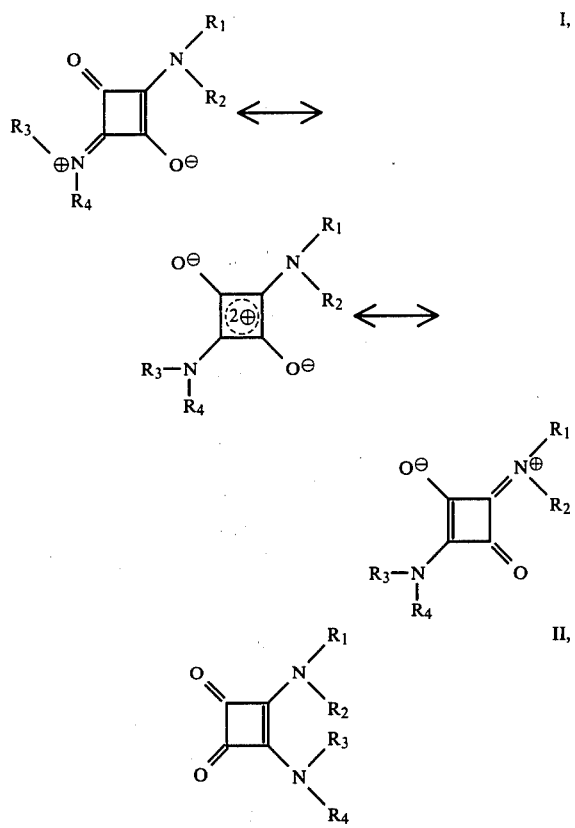

wherein $R_1$, $R_2$, $R_3$, and $R_4$, are identical or different, and represent (A) hydrogen, unsubstituted or substituted alkyl or alkenyl residues of 1–22 carbon atoms, one or more of which can also be substituted by hetero atoms;

(B) unsubstituted or substituted cycloalkyl or cycloalkylalkylene residues;

(C) unsubstituted or substituted aryl and arylalkylene residues;

(D) 3- to 8-membered, unsubstituted or substituted rings which contain one or more hetero atoms and which can optionally be connected to the nitrogen atoms of Formulae I and II by way of alkylene groups;

(E) furthermore the groups —$NR_1R_2$ and/or —$NR_3R_4$ represent 3- to 8-membered, unsubstituted or substituted rings which optionally contain additional hetero atoms; and (F) respectively $R_1$ and $R_3$ or $R_2$ and $R_4$ represent unbranched or branched, ring-anellated, saturated or unsaturated aliphatic chains which optionally carry functional groups.

6 Claims, No Drawings

SYNTHETIC RESIN STABILIZERS BASED ON QUADRATIC ACID AMIDES

BACKGROUND OF THE INVENTION

The field of the invention is shaped or unshaped synthetic resin compositions containing quadratic acid amide stabilizers.

The present invention relates to the use of bisamides of quadratic acid as stabilizers for selected shaped or unshaped synthetic resins where the bisamides have the general Formulas I and/or II as follows:

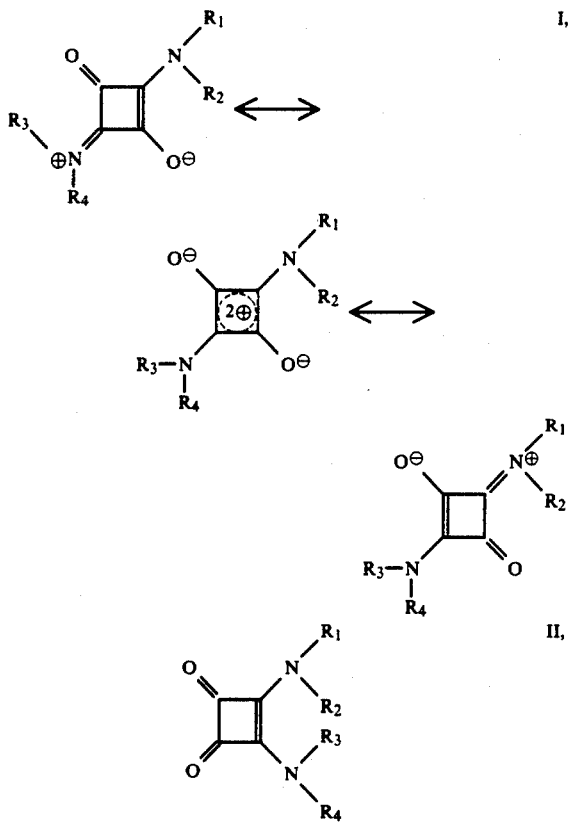

wherein $R_1$, $R_2$, $R_3$, and $R_4$, are identical or different, and represent (A) hydrogen, unsubstituted or substituted alkyl or alkenyl residues of 1-22 carbon atoms, one or more of which can also be substituted by hetero atoms;

(B) unsubstituted or substituted cycloalkyl or cycloalkylalkylene residues;

(C) unsubstituted or substituted aryl and arylalkylene residues;

(D) 3- to 8-membered, unsubstituted or substituted rings which contain one or more hetero atoms and which can optionally be connected to the nitrogen atoms of Formulae I and II by way of alkylene groups;

(E) furthermore the groups $-NR_1R_2$ and/or $-NR_3R_4$ represent 3- to 8-membered, unsubstituted or substituted rings which optionally contain additional hetero atoms; and (F) respectively $R_1$ and $R_3$ or $R_2$ and $R_4$ represent unbranched or branched, ring-anellated, saturated or unsaturated aliphatic chains which optionally carry functional groups.

The bisamides are prepared in accordance with conventional methods (e.g. "Angew. Chemie" [Applied Chemistry] 77 [1965] :680; 78 [1966]:927; 80 [1968]: 541; Tetrahedron Letters 1968 : 1339, 1969 : 4115; "Chem. Ber." [Chemical Reports] 103 [1970]: 3553; "Liebigs Ann. Chem. " [Liebig's Annals of Chemistry]1973 : 619) and the 1,2 bisamides of Formula II are prepared as disclosed in British Patent No. 1,186,096; French Patent No. 1,531,943 and German Published Application No. 1,669,798 the disclosures of which are included herein.

The selected shaped or unshaped synthetic resins include homo- and copolymers of olefins or diolefins, e.g. polyisoprene, polybutene, polypropylene, polyethylene of low and high density, polybutadiene, or saturated or unsaturated ethylene-propylene copolymers, ethylene-butene copolymers, ethylene-vinyl acetate copolymers, butadiene-styrene copolymers, butadiene-styrene-acrylonitrile copolymers, furthermore homo- and copolymers of styrene or its homologs, such as α methylstyrene, e.g. polystyrene, styrene butadiene copolymers, or so-called impact-resistant polystyrene types, such as graft polymers of styrene with elastomers or also mixtures of homo- or copolymers or graft polymers, and furthermore homo- and copolymers and graft polymers of vinyl chloride, such as polyvinyl chloride, polyvinylidene chloride, vinyl chloride-vinylidene chloride copolymers, vinyl chloride-vinyl acetate copolymers, or also polyvinyl acetate, polyether esters, or also polyurethanes, polyisocyanurates, polyacrylonitrile and the copolymers thereof, polyester amides and polyether ester amides.

Especially suitable synthetic resins are polyamides, for example homopolyamides, as they are produced in the usual way from lactams of more than 5 carbon atoms in the ring and/or from the corresponding ω amino acids, such as caprolactam, capryllactam, lauryllactam, undecyllactam, enantholactam, or from ω,ω'-diamines and ω, ω'-dicarboxylic acids of more than 3 carbon atoms between the functional groups, such as, for example, tetramethylenediamine, hexamethylenediamine, trimethylhexamethylenediamine, isophoronediamine, octamethylenediamine, dodecamethylenediamine, and adipic acid, pimelic acid, suberic acid, azelaic acid, sebacic acid, undecanedicarboxylic acid, dodecanedicarboxylic acid terephthalic acid, isophthalic acid, and furthermore the corresponding copolyamides and polyether amides. The homo- or copolyamides of lauryllactam are preferably utilized.

The polyester amides suitable as the synthetic resins in the present application are conventionally produced from low-molecular starting components, for example amino alcohols, lactones, diols, dicarboxylic acids, aminocarboxylic acids, lactams, and diamines, or by reactions between polyamides and polyesters (Polyamides ethers than Nylons 6 and 6, 6, part II, Stanford Research Institute, Nov. 1974, pp. 417–422). An especially advantageous process is described in German Published Application No. 2,542,467.

The polyether ester amides contain, as compared to the polyester amides, additionally ether groupings besides the ester and amino groups. The manufacture of polyether ester amides has been described, inter alia, in German Published Applications Nos. 2,523,991 and 2,527,885; and especially advantageous process is suggested in German Published Application No. 2,712,987. The particularly advantageous mixtures of polyether ester amides and polyamides are proposed in German Published Application No. 2,716,004.

The mechanical properties of synthetic resins are, as is known, extensively impaired by the effects of elevated temperatures, oxygen, and light radiation. Numerous substances have become known as stabilizers for synthetic resins (Thinius, "Stabilisierung und Alterung von Plastwerkstoffen" [Stabilization and Aging of Synthetic Resins] vol. 1: 167–634 [1969]).

The conventional stabilizers do not achieve the desired, broad spectrum of application so that in each case specifically chosen stabilizer systems must be utilized for the various synthetic resins. However, even within an individual class of synthetic resins, it is necessary to use a great variety of different stabilizer mixtures depending on the type of stabilization desired.

It is known from German Published Application No. 1,669,798 to employ, inter alia, 1,2-bisamides of quadratic acid as stabilizers against oxidative or thermaloxidative degradation of polyacetals.

SUMMARY OF THE INVENTION

Having in mind the limitations of the prior art it has been found surprisingly that bisamides of quadratic acid in a selected group of synthetic resins are equally well suitable as antiaging agents against the effect of hot atmospheric oxygen, sunlight (UV radiation), and hydrolyzing fluids, such as inorganic and organic acids, as well as alkalis. Moreover, a plurality of these compounds is superior to the customary stabilizers not only in the combination of the stabilizer activities, but in most cases also in the individual activity. This holds true, in particular, for the 1,3-bisamides. This broadened spectrum with respect to the stabilizing effect and with respect to the synthetic resins which can be employed could not be derived from the state of the art. Especially, the proposed bisamides have a stabilizing effect in the manufacture of shaped components exposed to a long-term effect of light, particularly in the open air. In this case, the shaped components retain their attractive appearance and, above all, also their good mechanical properties.

The stabilizers of the present invention are used in amounts of about 0.01–5% by weight, preferably in quantities of about 0.1–1% by weight, based on the weight of the synthetic resins.

DESCRIPTION OF THE PREFERRED EMBODIMENTS

Examples of the compounds according to Formula I, namely of the "1,3-bisamides," i.e. derivatives of 1-amino-3-ammonium-2-oxocyclobuten-4-olate and/or of 1,3-bis-amino-cyclobutene-diylium-2,4-diolate are the following:

for I(A): quadratic acid 1,3-bis(diethyl)amide; quadratic acid 1,3-bis(diisobutyl)amide; quadratic acid 1,3-bis(diethylhexyl)amide; quadratic acid 1,3-bis(di-$\beta$-hydroxyethyl)amide; quadratic acid 1,3-bis(N-methyl-$\beta$-hydroxyethyl)-amide; quadratic acid 1,3-bis(n-butyl)amide; quadratic acid 1,3-bis(lauryl)amide;

for I(B): quadratic acid 1,3-bis(cyclohexyl)amide; quadratic acid 1,3-bis(cyclododecyl)amide; quadratic acid 1,3-bis(cyclohexylmethylene)amide; quadratic acid 1,3-bis(4'-tert.-butylcyclohexyl)amide;

for I(C): quadratic acid 1,3-bisanilide; quadratic acid 1,3-bis(tolyl)amide; quadratic acid 1,3-bis(3',5'-di-tert.-butyl-4'-hydroxy)anilide; quadratic acid 1,3-bis(2'-hydroxy)anilide; quadratic acid 1,3-bis(phenylethylene)amide;

for I(D): quadratic acid 1,3-bis(pyridyl)amide; quadratic acid 1,3-bis(2'methylpyridyl)amide; quadratic acid 1,3-bis(morpholinopropylene)amide; quadratic acid 1,3-bis-(triazolyl)amide; quadratic acid 1,3-bis(-pyridylmethylene)amide;

for I(E): quadratic acid 1,3-bispiperidide; quadratic acid 1,3-bismorpholide; quadratic acid 1,3-bis(N'-$\beta$-hydroxyethyl)piperazide; quadratic acid 1,3-bisaziridide; quadratic acid 1,3-bispyrazolide; quadratic acid 1,3-bis(N'-methyl)piperazide; quadratic acid 1,3-bispyrrolide; quadratic acid 1,3-bisimidazolidinide; quadratic acid 1,3-bisimidazolide; quadratic acid 1,3-bisoxazolidinide; quadratic acid 1,3-bis(2',2',6',6'-tetramethyl)-piperidone-(4')-ide; quadratic acid 1,3-bispyrrolidinide.

Preferred are quadratic acid 1,3-bis(diethyl)amide, quadratic acid 1,3-bis(di-tert.-butyl)amide, quadratic acid 1,3-bis(dihydroxyethyl)amide, quadratic acid 1,3-bis(3',5'-di-tert.-butyl-4'-hydroxy)anilide, quadratic acid 1,3-bis(2'methylpyridyl)amide, quadratic acid 1,3-bispiperidide, quadratic acid 1,3-bis(N'-$\beta$-hydroxyethyl)-piperazide, quadratic acid 1,3-bispyrrolidinide, quadratic acid 1,3-bis(2',2',6',6'-tetramethyl)piperidone-(4')-ide.

Especially preferred are quadratic acid 1,3-bis-piperazide, quadratic acid 1,3-bis(diethyl)amide. The 1,3-bisamides are suitable, in particular, as UV stabilizers.

Examples of the compounds according to Formula II, namely of the "1,2-bisamides" i.e. derivatives of 1,2-diaminocyclobutene-3,4-dione are the following:

for II(A): quadratic acid 1,2-bis(di-tert.-butyl)amide; quadratic acid 1,2-bis(di-n-butyl)amide; quadratic acid 1,2-bis(n-propyl)amide; quadratic acid 1,2-bis($\beta$-hydroxyethyl)amide; quadratic acid 1,2-bis(n-butenyl)amide;

for II(B): quadratic acid 1,2-bis(cyclohexyl)amide; quadratic acid 1,2-bis(cyclooctyl)amide;

for II(C): quadratic acid 1,2-bisanilide; quadratic acid 1,2-bis(3',5'-di-tert.-butyl-4'-hydroxy)anilide; quadratic acid 1,2-bis(xylyl)amide; quadratic acid 1,2-bis(naphthyl)amide;

for II(D): quadratic acid 1,2-bis(pyridyl)amide; quadratic acid 1,2-bis(pyridylmethylene)amide;

for II(E): quadratic acid 1,2-bispiperidide; quadratic acid 1,2-bis(2',2',6',6'-tetramethyl)-piperidone(4')-ide; quadratic acid 1,2-bis(N'-methyl)piperazide; quadratic acid 1,2-bismorpholide; quadratic acid-1-diethyl-amide-2-piperidide;

for II(F): quadratic acid 1,2-o-phenylenediamide; quadratic acid 1,2-malonediimide; quadratic acid 1,2-oxaldiimide; quadratic acid 1,2-ethylenediamide.

Preferred are quadratic acid 1,2-bis(di-tert.-butyl)amide, quadratic acid 1,2-bis(lauryl)amide, quadratic acid 1,2-bis(3',5'-di-tert.-butyl-4'hydroxy)anilide, quadratic acid 1,2-bispiperidide, quadratic acid 1,2-bis(2',2',6',6'-tetramethyl)-piperidone-(4')-ide.

The synthetic resins can contain, in addition to the bisamides of quadratic acid used according to this invention, further additives, such as pigments, coloring agents, or plasticizers or also—if desired—additional stabilizers or optionally also blowing agents. It is also especially advantageous to utilize mixtures with other synthetic resins, particularly a mixture of polyether ester amides with polyamides.

The stabilizing agents according to the invention can be added to the synthetic resins in a conventional manner. For example, the bisamides can be added before or during the polymerization and/or polycondensation to the monomers, or they can be incorporated into the molding compositions in masticators or extruders. However, it is also possible to add the stabilizing agents to solutions of the synthetic resins, from which, for example, powders for coating compositions or films [sheets] are produced after removal of the solvent. The type of incorporation here is dependent, as usual, on the type of the synthetic resin, its manufacture, or its processing mode. Besides, the stabilizing agents can be introduced into the molding compositions during the manufacture of the molded components or—if particularly desired—applied to the molded components in a suitable manner, for example by the use of drums or by spraying in the form of a solution. Thus, it is possible to use the stabilizers for synthetic resins serving for the production of fibers, films, sheets, or other extruded or injection-molded articles. The shaped or unshaped synthetic resins can also be employed in the form of latices; they can, of course, also be utilized for the production of foam materials.

Synthetic resins containing bisamides of quadratic acid in quantities evoking a stabilizing effect are particularly suitable for the manufacture of molded components which must not lose the good mechanical properties and, concomitantly therewith, their attractive appearance, even upon long-term exposure to light, especially outdoors, wherein, as mentioned above, the 1,3-bisamides are preferred.

The following specific examples illustrate the use of the stabilizers of the present invention in the selected synthetic resins of the present invention:

EXAMPLE 1

Respectively 100 parts by weight of polyamide 12 (viscosity value/DIN [German Industrial Standard] 53 727 180 ml./g.) is mixed homogeneously with one part by weight of quadratic acid 1,2-bis(lauryl)amide (A); or 0.5 part by weight of quadratic acid 1,2-bis(n-butyl)amide (B); or 0.5 part by weight of quadratic acid 1,2-bis(4'-hydroxy)anilide (C); then molten in a twin-screw extruder, and granulated. The granules are injection-molded to samples having a thickness of 1 mm. These samples are used to carry out the tensile strength test according to DIN 53 455 in the fresh condition and after aging in a drying chamber with fresh air feed at 160° C.

The aging time is evaluated after which the elongation at rupture of the samples drops to half the value of the unaged specimens. Results:

| Specimen Identification | Aging Time (h) until the Elongation at Rupture has Dropped to 50% of the Initial Value |
| --- | --- |
| A | about 140 |
| B | about 210 |
| C | about 190 |
| Comparative specimen: Pentaerythritol tetra-(4-hydroxy-3,5-di-tert.-butylphenyl-propionate) | about 120 |

EXAMPLE 2

A specimen produced according to Example 1, consisting of 100 parts by weight of polyamide 12 (viscosity value 180 ml./g.) and 1 part by weight of quadratic acid 1,2-bis(n-butyl)amide is subjected to degradation by hydrolysis in 0.1N sulfuric acid at 80° C. until the specimen breaks upon flexing due to brittleness. This takes 340 hours. In comparison therewith, a specimen produced in the same way containing equal amounts of pentaerythritol tetra-(4-hydroxy-3,5-di-tert.-butylphenylpropionate) breaks already after 220 hours, corresponding to an improvement of 120 hours.

EXAMPLE 3

100 parts by weight of polyamide 12 (viscosity value 120 ml./g.) and 1 part by weight of quadratic acid 1,2-bis(n-butyl)amide are dissolved in a solvent by heating and precipitated as a powder by adding water. This powder was used, after drying, to coat steel sheets having a thickness of 1 mm. and having been heated to 350° C. in a fluidized bed coating process. The layer thickness of the polyamide was about 0.35 mm. The thus-coated sheets are aged in a drying chamber with fresh air feed at 160° C. until the reverse impact depression of the coating with the Erichsen device without crack formation has dropped to below 1 mm. This takes 300 hours. With the addition of the same amounts of tris(nonylphenyl)phosphite, this procedure takes 80 hours, i.e. an improvement of 220 hours has been achieved.

EXAMPLE 4

Respectively 100 parts by weight of polyamide 12 (viscosity value 180 ml./g.) is mixed homogeneously with 1 part by weight of quadratic acid 1,3-bismorpholide (F); or 1 part by weight of quadratic acid 1,3-bispiperidide (G); or 1 part by weight of quadratic acid 1,3-bis(N-methyl)piperazide (H); or 1 part by weight of quadratic acid 1,2-bis(n-butyl)amide (I); and then processed to specimens having a thickness of 1 mm. with the use of a screw-type injection molding machine. These specimens are tested in the Weather-O-Meter DMC with a xenon burner until the specimens have become so brittle due to light exposure that they break upon flexing. Results:

| Specimen Identification | Time Elapsed until Breakage of the Specimens during Flexing (h) |
| --- | --- |
| F | about 4,500 |
| G | over 7,000 |
| H | over 3,000 |
| I | about 2,800 |
| Comparative specimens: 2-(2'-Hydroxy-3'-tert.-butyl-5'-methylphenyl)-5-chlorobenzotriazole | about 2,500 |
| 2-(2'-Hydroxy-3',5'-di-tert.-butylphenyl)-5-chlorobenzotriazole | about 2,500 |

EXAMPLE 5

95 parts by weight of lauryllactam is polymerized hydrolytically in an agitator-equipped reactor while adding water to the reaction mixture. After expansion of the steam, the polyamide melt is combined, at a viscosity value of 140 ml./g., with 0.5 (K) or 2 (L) parts by weight of quadratic acid 1,2-bis(n-butyl)amide; or with 1 part by weight of quadratic acid 1-ethyl-ester-2-aminohexylamide-(1',6') (M), each portion in respectively 5 parts by weight of molten lauryllactam. The mixture is further stirred until the viscosity of the melt has reattained its original value; the reactor is then emptied and the polyamide 12 is granulated. In accordance with the process described in Example 1, the long-term thermal resistance is determined at 160° C. in hot air on injection-molded specimens having a thickness of 1 mm.

| Specimen Identification | Aging Time until the Elongation at Rupture Drops to 50% of the Initial Value (h) |
|---|---|
| K | about 60 |
| L | about 190 |
| M | about 50 |

By using in Examples 1–5, in place of polyamide 12, a polyamide 6,12 of hexamethylenediamine and dodecanedioic acid or a copolyamide 6/12 of caprolactam and lauryllactam (20:80) equally good results are attained.

EXAMPLE 6

Respectively 0.20 part by weight of the stabilizers set forth in the table below is admixed to respectively 100 parts by weight of polypropylene. The mixtures are molten and molded to sheeting under heating and pressure, the product having a thickness of 0.5 mm. The sheets are exposed to UV radiation at 45° C. in a weathering tester (Weather-O-Meter with xenon radiator), and the time is measured which elapses until the sheet becomes brittle. A specimen of the same sheeting is aged in a circulating-air furnace at 145° C., and the time until breakage due to brittleness occurs is also measured in this case.

For comparison, a specimen is utilized containing as the stabilizer the same amounts of octadecyl-β-(4-hydroxy-3,5-di-tert.-butylphenyl)-propionate.

EXAMPLE 7

Respectively 0.2 part by weight of the stabilizers set forth in the table below is admixed to respectively 100 parts by weight of impact-resistant polystyrene. The mixtures are molded into sheets having a thickness of 1 mm. at 180° C. under pressure. The sheets are irradiated with UV light in a Weather-O-Meter (with xenon radiator) at 45° C. and a color evaluation is conducted at 500 and 1,000 hours (yellowing).

A portion of the same specimens is aged in a circulating-air furnace at 80° C., and a color evaluation (yellowing) is effected after 10 days and after 20 days, and the impact resistance is measured as well.

For comparison purposes, a specimen was employed containing the same amounts of octadecyl-β-(4-hydroxy-3,5-di-tert.-butylphenyl)-propionate as the stabilizer.

EXAMPLE 8

Respectively 1.5 parts by weight of dibutyltin mercaptide, respectively 0.5 part by weight of stearic acid, and respectively 0.2 part by weight of the stabilizers set forth in the table below are admixed to respectively 100 parts by weight of polyvinyl chloride. The mixtures are processed into rolled sheeting for 5 minutes on a masticating rolling mill and shaped into pressed panels having a thickness of 1 mm. at 180° C.

Except for the same amounts of dibutyltin mercaptide and stearic acid, the comparative specimen does not contain any further stabilizer. The discoloration was then observed with the aid of the age testing devices indicated below:

1. Weather-O-Meter for a period of 250 days;
2. Aging under heating in a circulating-air chamber at 180° C. for a period of 30 days.

The following table shows the results of Examples 6–8 and the associated comparative-specimen tests.

TABLE

| Stabilizer | Light and Heat Aging Time Period (in Days) until Brittleness Occurs in the Weather-O-Meter (Xenon Radiator) | | | Aging in a Furnace at | | |
|---|---|---|---|---|---|---|
| | | | | 145° C. | 80° C. | 180° C. |
| | Example: 6 | 7 | 8 | Example 6 | Example 7 | Example 8 |
| Quadratic acid 1,2-bis(lauryl)-amide | 200 | 30 | 100 | 40 | 10 | 30 |
| Quadratic acid 1,2-bis(n-butyl)-amide | 150 | 40 | 100 | 60 | 10 | — |
| Quadratic acid 1,2-bis(hydroxy)-anilide | 120 | 25 | 100 | 60 | 10 | — |
| Quadratic acid 1,3-bismorpholide | 120 | 70 | 200 | 50 | 10 | — |
| Quadratic acid 1,3-bispiperidide | 250 | 150 | 250 | 100 | 25 | 30 |
| Quadratic acid 1,3-bis(N-methyl)-piperazide | 230 | 80 | 200 | 50 | 10 | 30 |
| Comparative Examples | 100 | 40 | 70 | 40 | 6 | — |

EXAMPLE 9

Respectively 1.0 part by weight of the stabilizers set forth in the table below is homogeneously mixed into respectively 100 parts by weight of a polyether ester amide produced from 75% by weight of lauryllactam and 25% by weight of an equimolar mixture of dodecanedioic acid and polytetrahydrofuran having a molecular weight of 1000. The thus-stabilized polyether ester amide is processed into samples having a thickness of 1 mm. on a screw-type injection molding machine. These samples are tested in a "Weather-O-Meter CML" with a xenon burner until the samples become so brittle due to light exposure that they break upon flexing.

| Test No. | Stabilizer | Time to Breakage of Sample (h.) |
|---|---|---|
| (1) | (a) 0.5 part by weight of N,N'-hexamethylene-bis(3,5-di-tert.-butyl)-4-hydroxycinnamic acid anhydride (b) + 0.5 part by weight of quadratic acid 1,3-bispiperidide | No change even after 1,300 hours. |
| (2) | 0.5 part by weight of (a) + 0.5 part by weight of quadratic acid 1,3-bis-di- | No change even after |

-continued

| Test No. | Stabilizer | Time to Breakage of Sample (h.) |
|---|---|---|
| | (hydroxyethyl)-amide | 1,300 hours. |
| (3) | 0.5 part by weight of (a) + 0.5 part by weight of quadratic acid 1,3-bis-2,4-dimethylpentylamide | No change even after 1,300 hours. |
| Comparative Test | 1.0 part by weight of 2-(2'-hydroxy-3'-tert.-butyl-5'-methylphenyl)-5-chlorobenzotriazole | Less than 1,000 hours. |

EXAMPLE 10

Respectively 100 parts by weight of a polyester amide produced from lauryllactam, dodecanedioic acid, and 1,4-bis (hydroxymethyl) cyclohexane in accordance with the process of German Published Application No. 2,542,467 is combined with the stabilizers described in the table of Example 9, this mixing step being conducted as disclosed in Example 9, and the molded components produced therefrom are tested in the Weather-O-Meter. After more than 1,300 hours of weathering, the samples still were not brittle, while during the analogously conducted comparative test brittleness occurred after about 950 hours.

We claim:

1. Compositions comprising synthetic resins having about 0.01–5% by weight of stabilizers based on the total weight of said synthetic resins wherein said synthetic resins are selected from the group consisting of polymers of olefins, diolefins, vinyl acetate, ether esters, urethanes, isocyanurates, acrylonitrile, styrene, vinyl chloride, polyamides, polyether amides, polyester amides, polyether ester amides or mixtures thereof; and said stabilizers are selected from the group consisting of bisamides of quadratic acid of the general Formulas I, II, or mixtures of I and II:

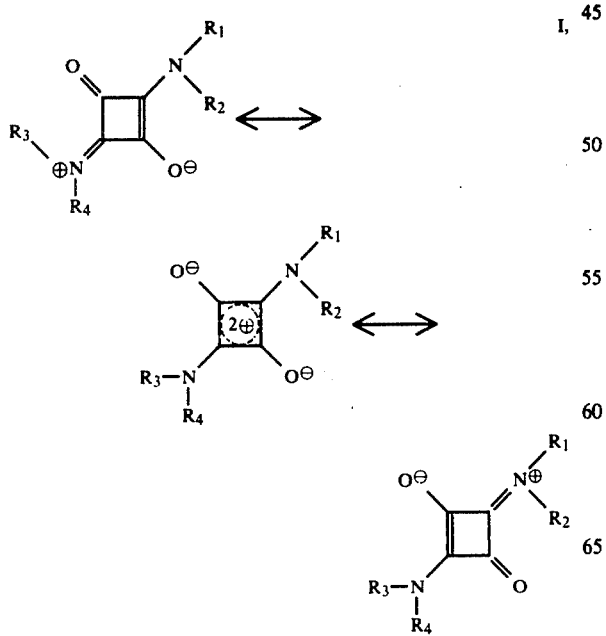

wherein $R_1$, $R_2$, $R_3$, and $R_4$ represent:

(A) hydrogen, alkyl groups having 1–22 carbon atoms, alkylene groups having 1–22 carbon atoms, hydroxysubstituted alkyl groups having 1–22 carbon atoms or hydroxysubstituted alkylene groups having 1–22 carbon atoms;

(B) cycloalkyl groups having 6–12 carbon atoms, cycloalkyl groups having 6–12 carbon atoms and substituted with alkyl groups having 1–6 carbon atoms, cycloalkyl groups having 6–12 carbon atoms and bound to the nitrogen atoms of Formula I by alkylene groups having 1–5 carbon atoms or cycloalkyl groups having 6–12 carbon atoms and bound to the nitrogen atoms of Formula II by alkylene groups having 1–5 carbon atoms;

(C) phenyl groups, phenyl groups substituted with alkyl groups having 1–4 carbon atoms, phenyl groups substituted with hydroxy groups, phenyl groups substituted with hydroxy groups and alkyl groups having 1–4 carbon atoms, phenyl groups bound to the nitrogen atoms of Formula I by alkylene groups having 1–3 carbon atoms or phenyl groups bound to the nitrogen atoms of Formula II by alkylene groups having 1–3 carbon atoms;

(D) 3–6 member heterocyclic groups having 1–3 nitrogen atoms, 3–6 member heterocyclic groups having 1–3 oxygen atoms, 3–6 member heterocyclic groups having 1–3 oxygen atoms, 3–6 member heterocyclic groups having 1–3 oxygen and nitrogen atoms, said heterocyclic groups substituted with alkyl groups having 1–3 carbon atoms, said heterocyclic groups bound to the nitrogen atoms of Formula I by alkylene groups having 1–5 carbon atoms or said heterocyclic groups bound to the nitrogen atoms of Formula II by alkylene groups having 1–5 carbon atoms;

(E) said

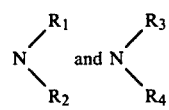

groups defining heterocyclic groups having 3–6 members, said

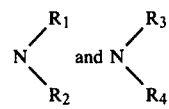

groups defining heterocyclic groups having 3–6 members where 1 or 2 of said members are nitrogen or oxygen, said heterocyclic groups substituted with 1–4 carbon alkyl groups, hydroxy groups or oxogroups; and (F) respectively $R_1$ and $R_3$ or $R_2$ and $R_4$ represent unbranched or branched, ring-anellated, saturated or unsaturated aliphatic chains.

2. The compositions of claim 1, wherein the specific compounds represented by general Formula I are:

for (A) selected from the group consisting of quadratic acid 1,3-bis(diethyl)amide; quadratic acid 1,3-bis(diisobutyl) amide; quadratic acid 1,3-bis(diethylhexyl)amide; quadratic acid 1,3-bis(di-$\beta$-hydroxyethyl)amide; quadratic acid 1,3-bis(N-methyl-$\beta$-hydroxyethyl)amide; quadratic acid 1,3(n-butyl) amide; or quadratic acid 1,3-bis(lauryl)amide;

for (B) selected from the group consisting of quadratic acid 1,3-bis(cyclohexyl)amide; quadratic acid 1,3-bis(cyclododecyl)amide, quadratic acid 1,3-bis(cyclohexylmethylene)amide; or quadratic acid 1,3-bis(4'-tert.-butylcyclohexyl)amide;

for (C) selected from the group consisting of quadratic acid 1,3-bisanilide; quadratic acid 1,3-bis(Tolyl)amide; quadratic acid 1,3-bis(3',5'-di-tert.-butyl-4'-hydroxy)anilide; quadratic acid 1,3-bis(2'-hydroxy)anilide; or quadratic acid 1,3-bis(phenylethylene)amide;

for (D) selected from the group consisting of quadratic acid 1,3-bis(pyridyl)amide; quadratic acid 1,3-bis(2'-methylpyridyl)amide; quadratic acid 1,3-bis(morpholinopropylene)amide; quadratic acid 1,3-bis-(triazolyl)amide; or quadratic acid 1,3-bis(pyridylmethylene)amide; and for (E) selected from the group consisting of quadratic acid 1,3-bispiperidide; quadratic acid 1,3-bismorpholide; quadratic acid 1,3-bis(N'-$\beta$-hydroxyethyl)piperazide; quadratic acid 1,3-bisaziridide; quadratic acid 1,3-bis-pyrazolide; quadratic acid 1,3-bis(N'-methyl)piperazide; quadratic acid 1,3-bispyrrolide; quadratic acid 1,3-bisimidazolidinide; quadratic acid 1,3-bisimidazolide; quadratic acid 1,3-bisoxazolidinide; quadratic acid 1,3-bis(2', 2', 6', 6'-tetramethyl) piperidone-(4')-ide; or quadratic acid 1,3-bispyrrolidinide.

3. The compositions of claim 1, wherein the specific compounds represented by general Formula II are:

for (A) selected from the group consisting of quadratic acid 1,2-bis(di-tert.-butyl)amide; quadratic acid 1,2-bis(di-n-butyl)amide; quadratic acid 1,2-bis(n-propyl)amide; quadratic acid 1,2-bis($\beta$-hydroxyethyl)amide; or quadratic acid 1,2-bis(n-butenyl)amide;

for (B) selected from the group consisting of quadratic acid 1,2-bis(cyclohexyl)amide; or quadratic acid 1,2-bis(cyclooctyl)amide;

for (C) selected from the group consisting of quadratic acid 1,2-bisanilide; quadratic acid 1,2-bis(3'5'-di-tert.-butyl-4'-hydroxy)anilide; quadratic acid 1,2-bis(xylyl)amide; or quadratic acid 1,2-bis(naphthyl)amide;

for (D) selected from the group consisting of quadratic acid 1,2-bis(pyridyl)amide; or quadratic acid 1,2-bis(pyridylmethylene)amide;

for (E) selected from the group consisting of quadratic acid 1,2-bispiperidide; quadratic acid 1,2-bis(2',2',6',6'-tetramethyl)-piperidone(4')-ide; quadratic acid 1,2-bis(N'-methyl)piperazide; quadratic acid 1,2-bismorpholide; or quadratic acid-1-diethyl-amide-2-piperidide; and for (F) selected from the group consisting of quadratic acid 1,2-o-phenylenediamide; quadratic acid 1,2-malonediimide; quadratic acid 1,2-oxaldiimide; or quadratic acid 1,2-ethylenediamide.

4. The compositions of claim 1, wherein said synthetic resins have about 0.1–1% by weight of said stabilizers.

5. The compositions of claim 2, wherein said synthetic resins have about 0.1–1% by weight of said stabilizers.

6. The compositions of claim 3, wherein said synthetic resins have about 0.1–1% by weight of said stabilizers.

* * * * *